United States Patent

[11] 3,604,895

| [72] | Inventor | Robert Harold MacKay<br>Fort Wayne, Ind. |
|---|---|---|
| [21] | Appl. No. | 871,831 |
| [22] | Filed | Oct. 28, 1969 |
| [45] | Patented | Sept. 14, 1971 |
| [73] | Assignee | Lincoln Manufacturing Company, Inc.<br>Fort Wayne, Ind. |

[54] ELECTRICALLY HEATED STEAM TREATMENT DEVICE
18 Claims, 14 Drawing Figs.

[52] U.S. Cl. .................................................. 219/401,
21/98, 99/216, 126/369, 219/440
[51] Int. Cl. ..........................................F27d 11/02,
A21b 1/00, A21b 1/22
[50] Field of Search ......................................... 219/401,
440, 362; 99/216; 21/98; 126/369

[56] References Cited
UNITED STATES PATENTS

| 3,077,530 | 2/1963 | Chase et al. | 219/401 |
|---|---|---|---|
| 1,958,590 | 5/1934 | Pierce | 219/401 |
| 2,494,022 | 1/1950 | Weintrol et al. | 219/401 X |
| 3,030,486 | 4/1962 | Lashley | 219/401 X |
| 3,350,542 | 10/1967 | Getman | 219/412 |
| 3,428,783 | 2/1969 | Niles | 219/401 |
| 3,495,071 | 2/1970 | Niles | 219/401 |

FOREIGN PATENTS

| 526,071 | 6/1956 | Canada | 219/401 |
|---|---|---|---|
| 931,852 | 8/1955 | Germany | 219/401 |

*Primary Examiner*—Volodymyr Y. Mayewsky
*Attorney*—Jeffers and Rickert

ABSTRACT: A steam treatment device in which a chamber having an access door is provided for receiving material to be treated. The access door seals the chamber when closed.

The device includes an arrangement for supplying water to the chamber and an electrical heating arrangement for converting the water to steam and a valve arrangement for maintaining a predetermined steam pressure within the chamber.

The device has a timer for controlling the length of the treatment cycle and also has interlocks so that the device will operate only when the access door is closed and opening of the access door is prevented while the device is in operation.

PATENTED SEP 14 1971

INVENTOR
ROBERT H MACKAY
by JEFFERS & YOUNG
Attorneys

ELECTRICALLY HEATED STEAM TREATMENT DEVICE

The present invention relates to a treatment device, and particularly to such a device which utilizes the medium of steam at a relatively low pressure.

Steam-type treatment devices, such as pressure cookers, are known and heretofore have taken the form of vessels having lids sealed thereon and adapted for operation at relatively high pressures, say 10 to 15 pounds per square inch.

Such devices are inherently dangerous because of the pressure at which they operate and are somewhat time consuming, in that it takes a substantial period of time to build up the heat necessary to develop the requisite steam pressure and, furthermore, a substantial period of time must elapse at the end of the treatment cycle before the lid of such a vessel can safely be removed.

Still further, such devices in the form of steam cookers are principally for making stews and soups and rather fluid dishes and are rarely employed for cooking large cuts of meat and the like.

The present invention has as an object the provision of a device of the nature referred to which operates through the medium of steam, but which eliminates the problems encountered with the use of high pressure steam in a pressure vessel.

Another object of the present invention is the provision of a cooking device which employs steam as a heat transfer medium which will receive relatively large cuts of meat and the like.

A still further object of the present invention is the provision of a cooking device, utilizing steam in which the device can be placed in operation quickly and which can be unloaded quickly after the cooking cycle has been completed.

Still further, another object of the present invention is the provision of a steam cooking device of the nature referred to in which the cooking cycle is controlled in accordance with a preset time.

A particular object in the present invention is the provision of a steam cooker which operates at relatively low pressure and which has a relatively large access door to the cooking chamber, and in which interlocks are provided that prevent operation of the device when the access door is opened and which prevents opening of the access door while the device is in operation.

BRIEF SUMMARY OF THE INVENTION

According to the invention, a generally cubicle chamber is mounted in a frame and surrounded with heat-insulating material. An access door is provided on the frame for sealingly engaging the open side of the chamber during operation.

Electric heating means are provided on the bottom of the chamber and a water supply line is also provided, which admits water into the chamber up to a predetermined level therein. The water is maintained at the predetermined level and the electric heating means causes it to generate steam and relief valves connected between the upper part of the chamber and the atmosphere maintain the pressure at uniform low level. Material to be treated is supported in the chamber above the liquid level.

A timer controls the energization of the heating means. A door lock prevents opening of the door while the heating means is energized, and a door-operated switch prevents energization of the heating means while the door is open.

A drain line leading from the chamber is operable for draining water therefrom at the end of the period set on the timer.

The top wall of the treatment chamber could also be provided with heat if so desired.

The treatment device according to the present invention is adapted for a plurality of uses wherever treatment with heat and moisture is required.

In the appended description, the device has been specifically described as a cooking device but it will be understood that where the term "cooking" is employed, it is intended to refer broadly to the treatment of materials.

In general, the treatment of material, and particularly of food stuffs, can be considered to be heating, reheating, reconstituting, or cooking. The heating and reheating call merely for the supply of heat to the material being treated, while the reconstituting generally requires the use of heat with the addition of moisture.

In the case of cooking the material is treated with heat and it may or may not take on moisture from the ambient atmosphere.

In any case, the four contemplated treatment conditions all differ from each other somewhat and while they can all be applied to the treatment of food stuffs, it is also possible that other materials can be treated in substantially the same manner, for example, during manufacturing processes.

The foregoing objects, as well as still other objects and advantages, of the present invention will become more apparent upon reference to the following detailed specification, taken in connection with the accompanying drawings, in which.

DETAILED DESCRIPTION OF THE INVENTION

Figures 1, 2, 3:
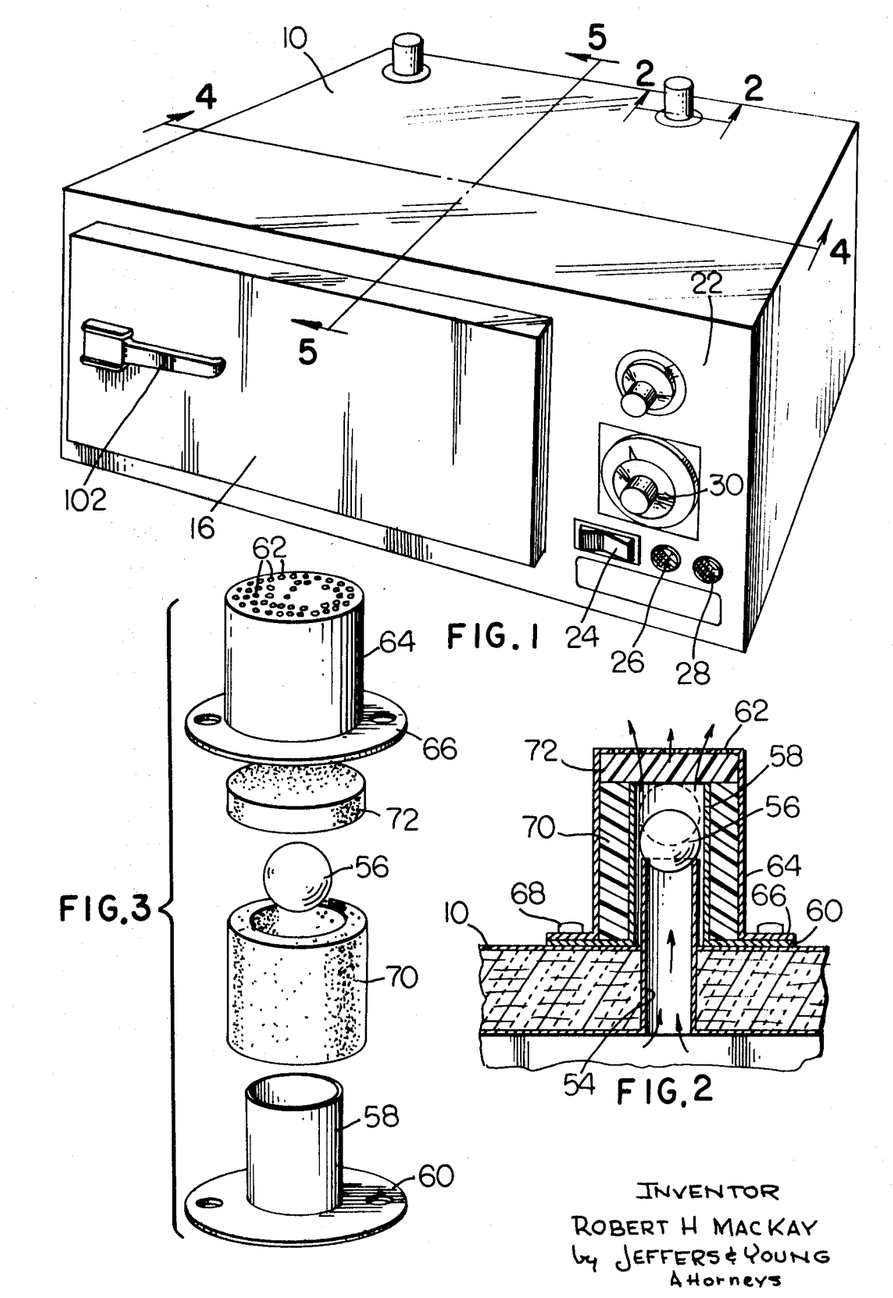
FIG. 1 is a perspective view showing a cooking device according to the present invention.
FIG. 2 is a vertical sectional view indicated by line II—II on FIG. 1, and showing a pressure-controlling valve arrangement according to the present invention.
FIG. 3 is an exploded perspective view showing principal components of the valve arrangement of FIG. 2.
Figure 4:
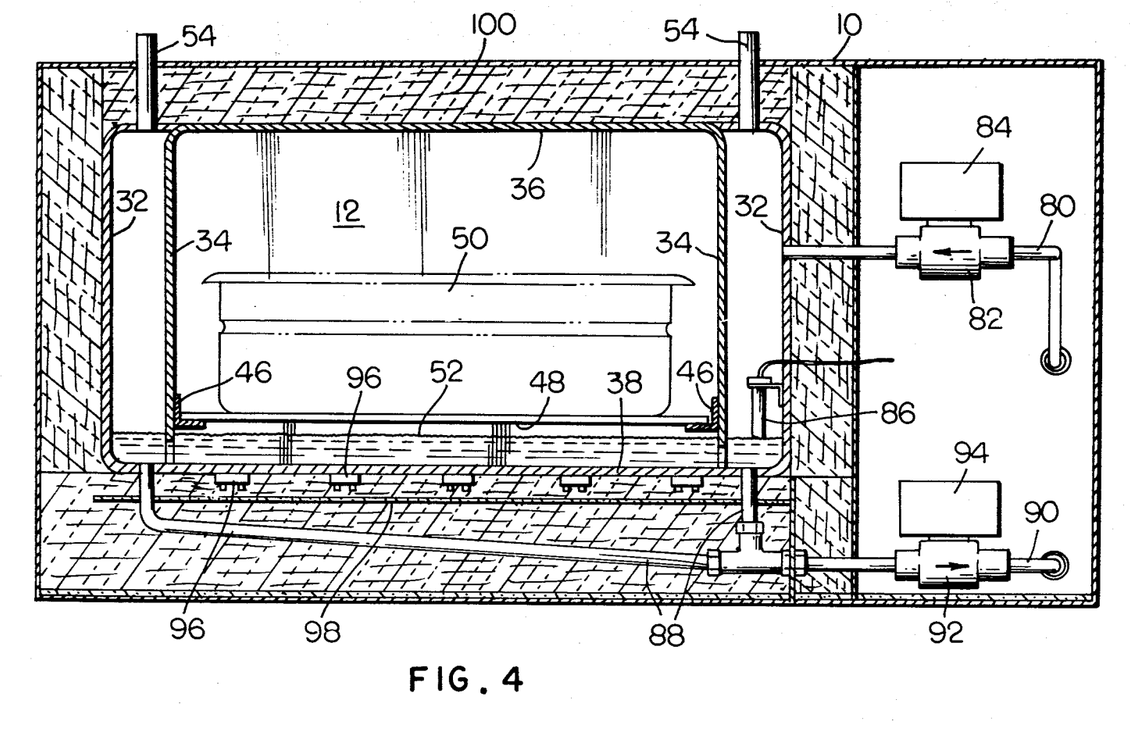
FIG. 4 is a longitudinal cross section taken through the device and is indicated by line IV—IV on FIG. 1.
Figure 5:
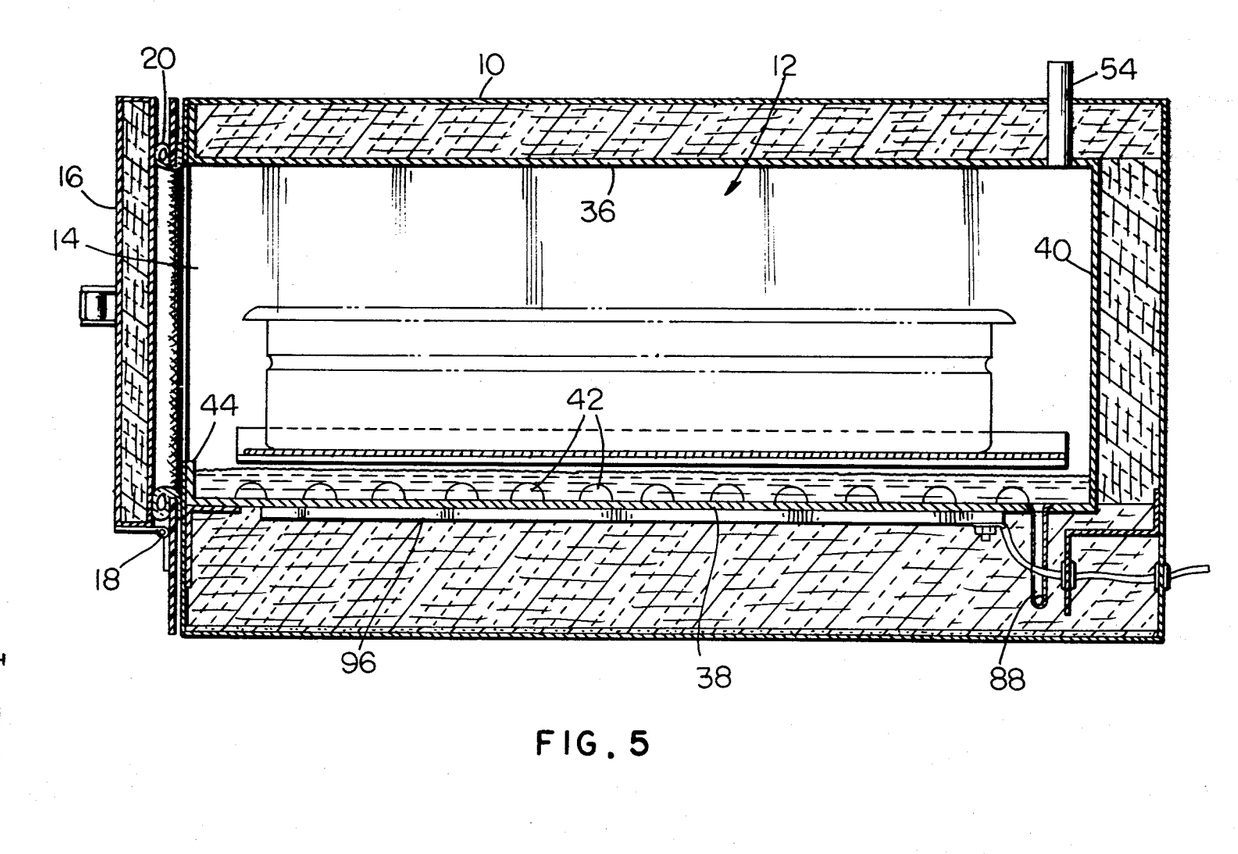
FIG. 5 is a transverse cross-sectional view through the device and is indicated by line V—V on FIG. 1.

Referring to the drawings somewhat more in detail, and with particular reference to FIGS. 1, 4 and 5, the device according to the present invention will be seen to take the form of a boxlike frame 10 within which is a cooking chamber, generally indicated at 12. THe cooking chamber 12 is open at one end as at 14 and an access door 16 is provided for the said opening. The access door is hinged, as at 18, at the bottom or at one end and, when closed, sealingly engages a rubberlike gasket 20 mounted about the periphery of opening 14 and suitably clamped in place on the frame of the device.

As will be seen in FIG. 1, access door 16 is located toward one side of the unit so that a section 22 of the unit at one end is provided for receiving the controls for the unit. The controls referred to comprise an on-off switch 24 and signal lights 26 and 28 and an adjustable timer 30. The space rearwardly of the controls is occupied by valves and conduits, as will be explained hereinafter.

The aforementioned cooking chamber 12, as will best be seen in FIGS. 4 and 5, comprises a metallic enclosure having outer sidewalls 32 and inner sidewalls 34. Chamber 12 will be seen to consist of an inner chamber portion formed between inner walls 34 and an outer chamber portion formed between outer walls 32. The chambers have a single upper wall 36 and a single lower wall 38 and a single rear wall 40 which completes the enclosure of both chambers with the exception of the open side 14, which is closed by door 16.

The lower ends of inner walls 34 are notched, as at 42, so that water supplied to the space between walls 32 and 34 will extend completely across the bottom wall 38. At the opening 14, a short end wall 44 is provided and is of a greater height than the normal water level in the chambers.

On the insides of inner walls 34 are mounted the guides 46, which slidably receive a tray 48 on which a cooking vessel 50 can be placed. It will be noted that the tray 48 is disposed above the upper level 52 of liquid in the chambers. Tray 48, as will be seen in FIG. 6, may be provided with holes 49.

The pressure within the chambers is maintained by valve arrangements connected thereto and communicating with the atmosphere. As will be seen in FIG. 4, conduits 54 extend upwardly from the space between walls 32 and 34 and out through the top of frame 10 of the device. On top of frame 10 of the device the aforementioned conduits 54 are provided with valve balls 56 of a predetermined weight so that a predetermined steam pressure, say, one pound per square inch can be maintained within the chambers. For retaining balls 56 in position at the upper ends of conduits 54 and for preventing noisy operation thereof, while permitting exhausted steam to escape, an enclosing and silencing arrangement is provided which is illustrated in FIGS. 2 and 3.

The aforementioned device comprises a first inner sleeve 58 and surrounding the respective conduit 54 and its ball 56 with clearance and extending a substantial distance above the respective ball 56. Sleeve 58 has a flange 60 on the bottom. A second member in the form of an inverted cup, has a perforated bottom part 62, a sleevelike sidewall 64, and a bottom flange 66 and is mounted in surrounding relation to sleeve 58 with screws 68 securing the flanges 60 and 66 to the frame of the device.

Interposed between the sleeves 58 and 64 is a sleeve 70 of porous material, foamed polystyrene, for example, and a disc of porous material, at 72, is provided between the underside of bottom wall 62 of the cup-shaped member and the upper ends of sleeves 58 and 70. The arrangement provides for relatively free passage of steam out of the device as it escapes past ball 56 but silences the operation of the ball and, likewise silences the sound of the escaping steam.

Two or more of the valves may be provided as might be desired.

The water in the cooking chamber is supplied thereto by way of a water supply conduit 80 in which is a solenoid operated valve 82 having an actuating solenoid 84. Energization of solenoid 84 will open valve 82 and permit water to be supplied to the chamber. Mounted on the inner side of wall 32 is a water level control switch 86 which, at a certain water level in the chamber completes a circuit and interrupts the supply of water to the chamber as will be seen hereinafter.

As will be seen in FIG. 4, drain conduits 88 lead from the bottom of the chamber to a drain conduit 90 and disposed in conduit 90 is a drain valve 92 having an actuating solenoid 94 which, when energized, will open the drain valve and permit the water to drain out of the chamber.

For heating the water in the chamber up to the point it evolves steam, there are provided the electric resistance heating elements 96 secured to the underside of the bottom wall 38 of the cooking chamber and preferably covered by a board of hard heat-resistant electrical insulating material 98.

The space within frame 10 and surrounding the chamber is filled with heating insulating material 100 so that little heat is lost from the chamber through the walls of the device.

Figures 6, 7, 8:
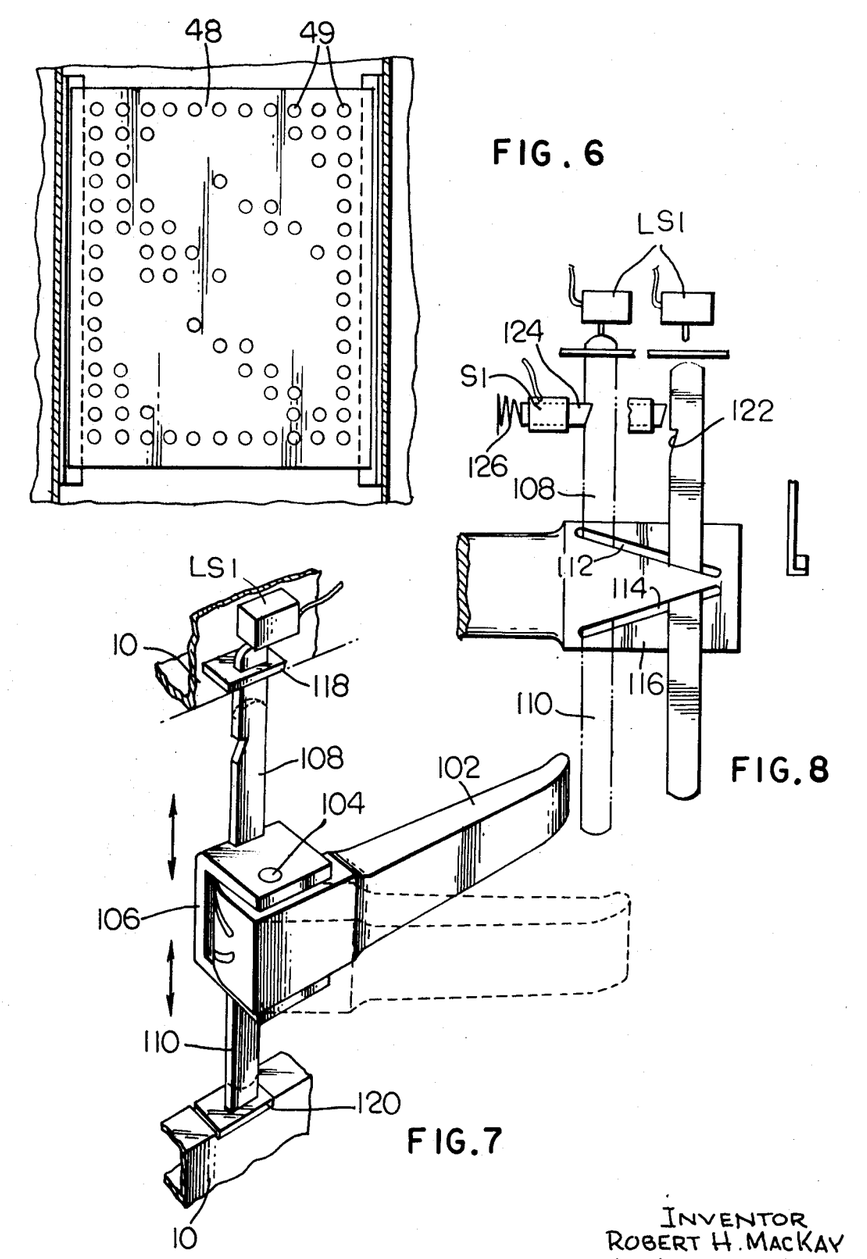
FIG. 6 is a fragmentary plan view looking down on top of the tray which is provided for supporting the cooking vessel in the device.
FIG. 7 is a perspective view showing a door latch mechanism and the operating lever therefor.
FIG. 8 is a development of the door latch mechanism showing how the latch bars are actuatable between latching and unlatching positions.
Figure 9:
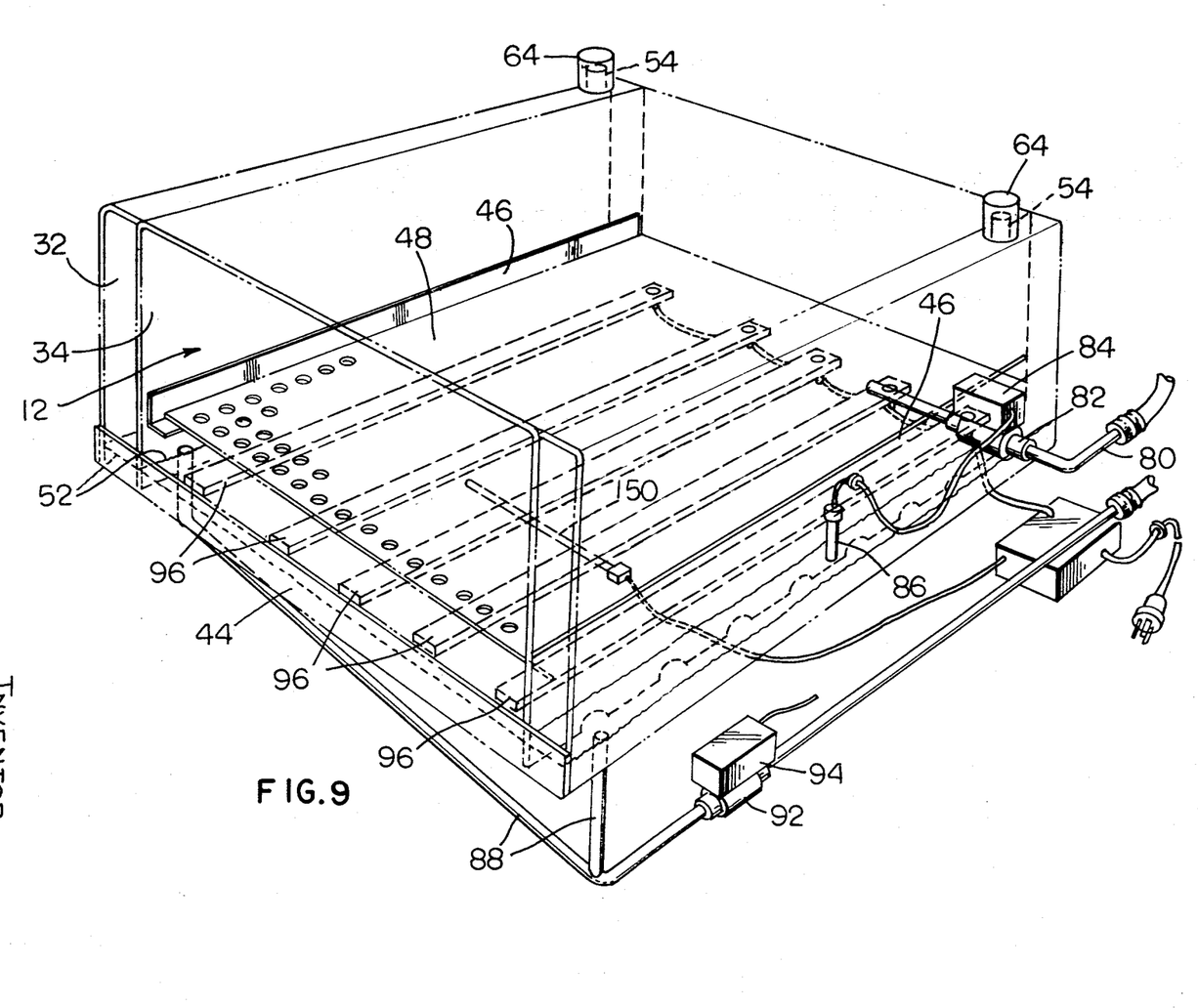
FIG. 9 is a schematic perspective view showing the principal parts of the device according to the present invention.

The access door 16 is provided with a lever 102 which operates a latch mechanism for holding the door closed and pressed against a gasket 20 in sealing relation thereto. The latch arrangement is illustrated in FIGS. 7 and 8, wherein it will be seen that lever 102 is pivoted on the door 16 on a pivot axis 104. Pivot axis 104 is provided in a U-shaped member 106 carried by the door and in which U-shaped member there are slidably mounted the latch bars 108 at the top and 110 at the bottom. Each latch bar has its end nearest U-shaped member 106 bent inwardly and formed on an incline and engaging a respective inclined slot 112 and 114 in the arcuate end portion 116 of lever 102.

Arcuate end portion 116 is concentric with the axis of pivot pin 104 and bars 108 and 110 are guided for vertical movement in U-shaped member 106 so that as lever 102 is rotated about pivot 104, bars 108 and 110 are moved in the vertical direction.

When lever 102 is in its full line position in FIG. 7, bar 108 is in its uppermost position and bar 110 is in its lowermost position and the bars engage respective latch plates 118 and 120 provided in frame 10 of the device. When the lever is moved to its dotted line position in FIG. 7, bar 108 is moved downwardly and bar 110 is moved upwardly to disengage from their respective latch plates and the access door can then be opened.

Advantageously, one of the latch bars, for example, latch bar 108, actuates a limit switch LS1 when the latch bar is in its uppermost position. This limit switch forms a portion of an interlock which prevents operation of the device except when the access door 16 is closed and latched.

Also, one of the latch bars, for example, latch bar 108, may be provided with a notch 122 for receiving a solenoid-operated lock member 124 when the latch bar is in its door latched position. This door lock forms another part of the interlock mechanism, and is arranged to prevent the door from being opened as long as the device is in operation. The lock member 124 is spring biased by spring 126 toward locking position, while energization of a solenoid S1 will withdraw the lock member and permit the door to be unlocked and opened.

Figure 10:
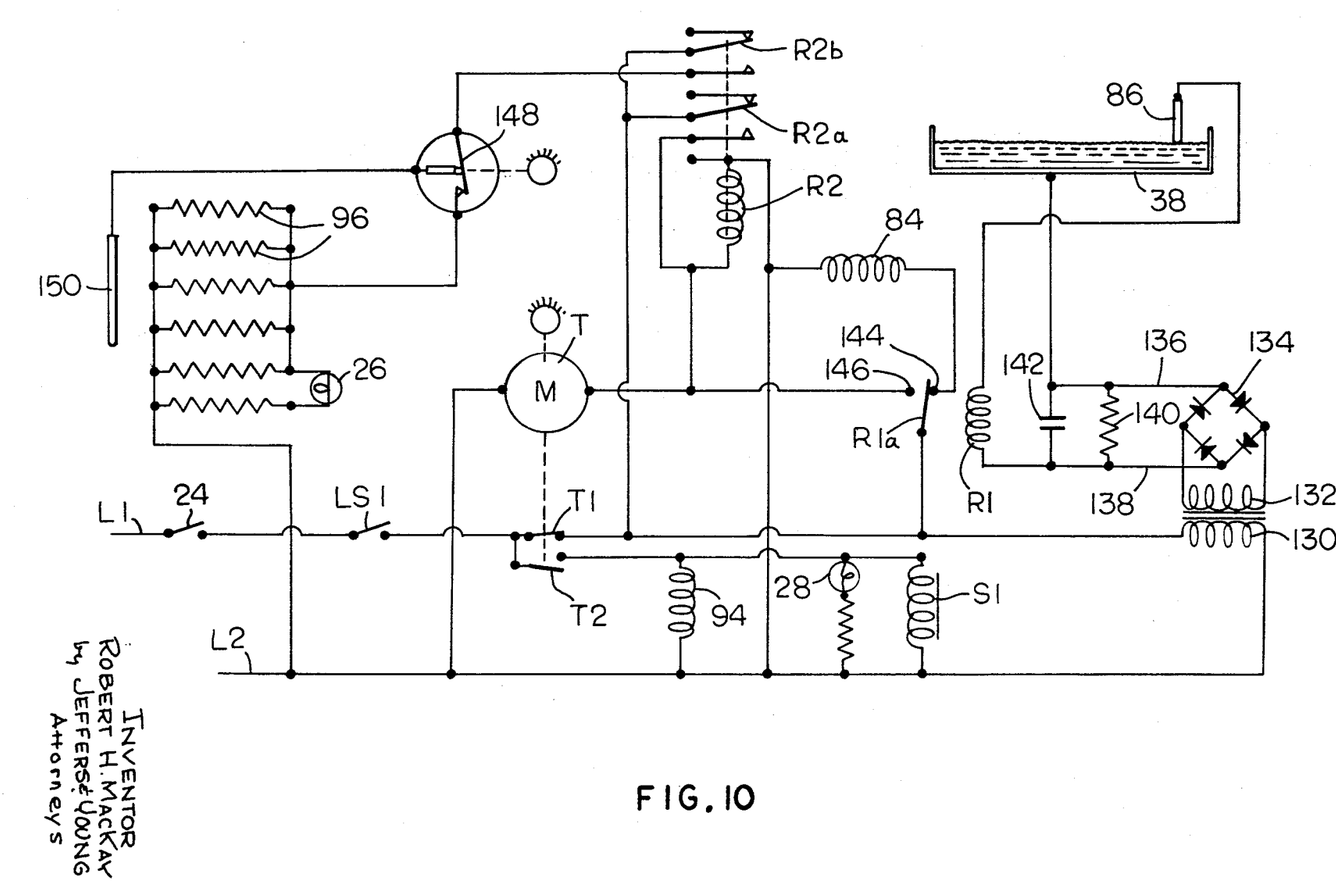
FIG. 10 is a schematic representation of a preferred electric control circuit arrangement for controlling the operation of the device.

Turning now to the control circuit of FIG. 10, power is supplied to the device from power lines L1 and L2. These lines may be at 115 volts or 230 volts, for example, and control the operation of the fill and drain valves and the heating elements 96, previously referred to.

In the circuit of FIG. 10, it will be seen that disposed in line L1 is main switch 24 and the door operated limit switch LS1 and the timber blade T1 all in series. In series with the aforementioned switches is the primary 130 of a transformer having a reduced voltage secondary 132 connected across two terminals of a rectifier bridge 134 which supplies output wires 136 and 138.

Connected across wires 136 and 138, is a resistor 140 and a capacitor 142. Wire 138 connects to one end of a relay solenoid R1, the other end of which is connected to one terminal of the aforementioned liquid level control switch 86. The other terminal of this switch may constitute the bottom wall 38 of the cooking chamber which is connected to wire 136. When the liquid level is such that a circuit is completed between wires 136 and 138, relay coil R1 is energized and its blade R1a shifts from its position of contact with the terminal 144 to a position of contact with another terminal 146.

Terminal 144 is connected to one end of the aforementioned solenoid 84 of fill valve 82, with the other side of the said solenoid being connected to power line L2. Blade R1a is connected to power line L1 so that whenever blade R1a rests on terminal 144 and main switch is closed and door switch LS1 is closed and timer blade T1 is closed, solenoid 84 will be energized. As soon as relay R1 is energized, indicating that the proper volume of water is in the chambers, blade R1a leaves terminal 144 and the fill valve closes. When blade R1a leaves terminal 144 it closes on terminal 146 and this will supply energy to timer T, which has one side connected to terminal 146 and the other side connected to power line L2.

Also, terminal 146 is connected to one end of a relay coil R2, the other end of which is connected to power line L2 so that relay coil R2 is also energized. When relay coil R2 energizes it closes its blades R2a and R2b. Closing of the blade R2a completes a holding circuit for relay coil R2 back to power line L1 while closing of blade R2b completes a circuit from power line L1 through thermostatically controlled switch 148 to resistance heating elements 96 and then back to power line L2. Simultaneously with the energization of heating elements 96, signal lamp 26 visible on the face of the unit is illuminated.

The thermostatically controlled switch 148 is then under the control of a thermostat 150, which is located in any suitable place within the unit and is either sensitive to the temperature of the bottom wall 38 of the chamber or to the steam temperature 77 within the unit. Above a predetermined temperature switch 148 opens and interrupts the supply of current to the heating elements and below that temperature, switch 148 closes and resumes the supply of energy to the heating elements.

Timer T, as mentioned, is presettable and, after the time preset thereon has expired, its blade T1 will open while its blade T2 will close.

When blade T1 opens the supply of energy to timer T and relay coil R2 and relay coil R1 and the primary 130 of the aforementioned transformer is interrupted, the cooker goes out of operation. Closing of blade T2 of the timer supplies energy to the solenoid 94 of the drain valve to commence draining the chamber of the liquid therein and energizes the second lamp 28 visible on the front of the device to indicate that the cooking cycle is completed and also energizes solenoid S1 pertaining to the door lock to release the door latch and permit the door to be opened.

When the door of the device is opened, door switch LS1 will open and interrupt the supply of energy to the drain solenoid and the signal lamp 28 and the door latch solenoid S1. Thereafter, main switch 24 can be adjusted to its off position and the device will be ready to commence a new cycle whenever another tray of foodstuff is to be cooked.

It has been mentioned that the device might operate at about one pound per square inch steam pressure, but it will be understood that this is exemplary only and that the pressure within the chamber might be higher or lower than that referred to.

The cooking chamber has been shown to be double-walled at the ends, but it will be understood that a single wall chamber could be employed, or that the chamber could be double-walled on all sides except the open side and bottom thereof, if so desired.

The particular liquid level switch arrangement is also exemplary and other type switches, such as float controlled switches could be employed.

The outside of the frame and door of the device can be covered by decorative, easily cleaned, panels, if so desired.

Figure 11:
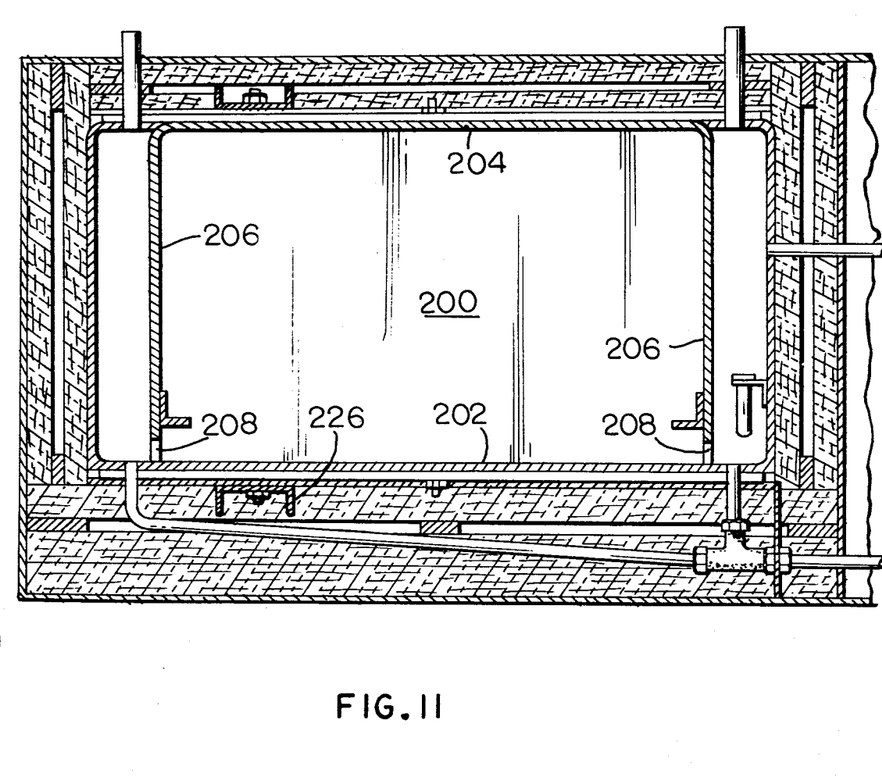
FIG. 11 is a transverse section of a modification.
Figure 12:
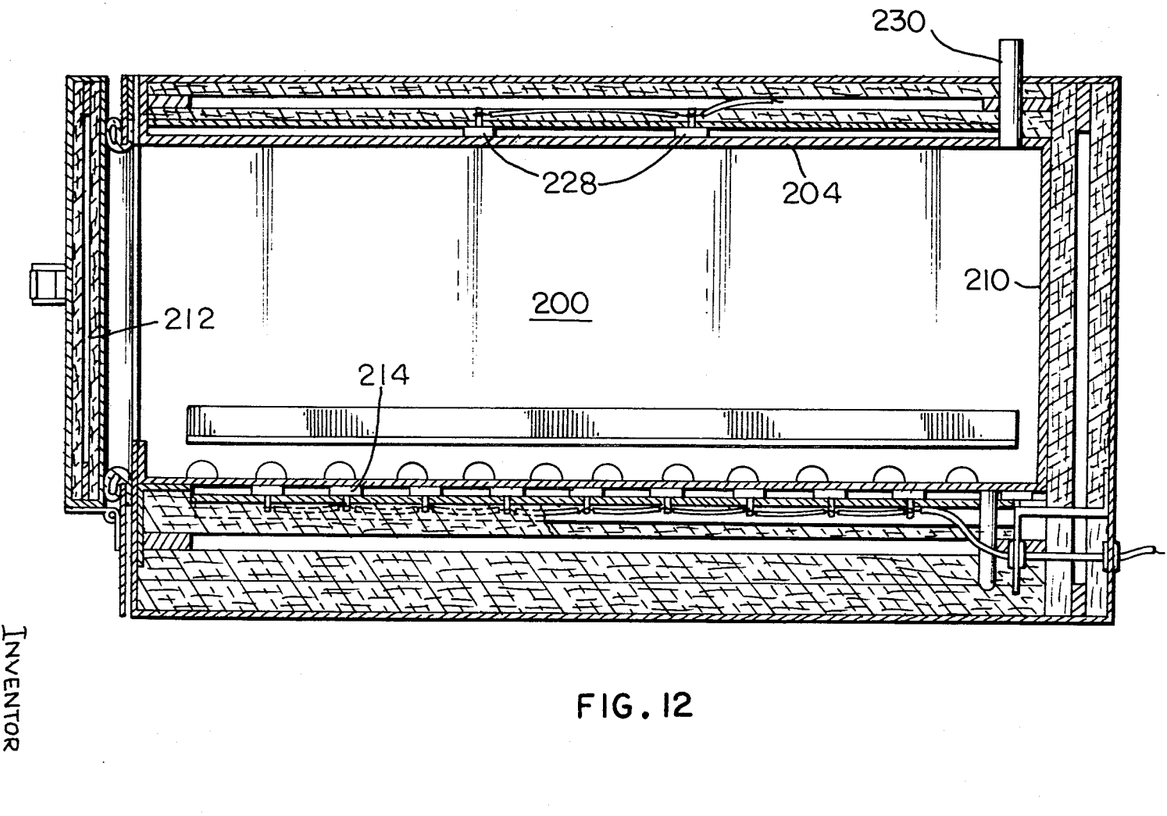
FIG. 12 is a longitudinal section of the modification of FIG. 11.
Figure 13:
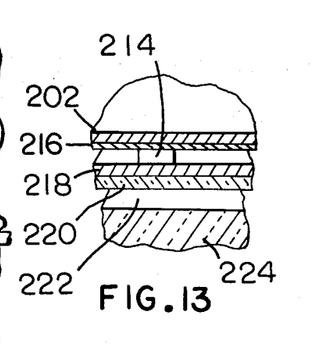
FIG. 13 is a fragmentary sectional view showing a preferred way of clamping the heating elements to the bottom wall of the treatment chamber.
Figure 14:
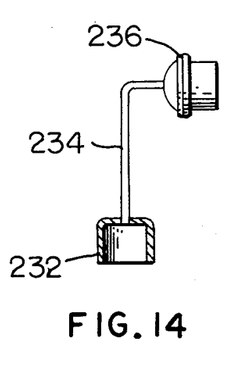
FIG. 14 is a schematic view of a modified form of liquid level detector.

A modified arrangement of the device is shown in FIGS. 11 and 12, a detail thereof illustrated in FIG. 13, while a modified form of liquid detector is schematically shown in FIG. 14.

Referring first to FIGS. 11, 12 and 13, the treatment chamber is indicated at 200 and has a bottom wall 202 and a top wall 204, sidewalls 206 having notches 208 in the lower edges, a back wall 210, and a front wall in the form of the hinged access door 212. Outside sidewalls 206 are the wing chambers 209.

In the modification of FIGS. 11 and 12, the heating elements 214 extend transversely of the chamber instead of longitudinally thereof as shown in the first described modification. As will be seen in FIG. 13, the heating elements 214 are clamped between an upper steel plate 216 and a lower steel plate 218. Plate 216 is held against the bottom wall 202 of the treatment chamber so that effective transfer of heat from heating elements 214 to bottom wall 202 is had while steel plate 216 is effective for causing distribution of the heat.

Plate 218 also receives heat from the heating elements and this serves further to distribute the heat because this plate is provided with a layer of insulation 220 on the bottom which prevents any substantial loss of heat from bottom wall 202.

Beneath insulation 220 is an air space 222 and following the air space is another layer of insulation 224. The described arrangement has been found to be particularly effective for promoting uniform distribution of heat over bottom wall 202 of the treatment chamber.

As will be seen in FIG. 11, plate 218 may advantageously be clamped in place as by channel means 226 extending transversely to the length of heating elements 214.

FIGS. 11 and 12 will also show that heating elements 228 could be provided on top wall 204 of treatment chamber 200 and could be clamped against the top wall in the same manner as heating elements 214 are clamped against the bottom wall of the chamber. The treatment device of the modification of FIGS. 11 and 12 operates in the same manner as described previously.

In connection with both modifications, it has been found that, even though relief valve means are provided leading from the wing or side chambers, namely relief valve means 54 in the first described modification and relief valve means 230 in the modification of FIGS. 11 and 12, the main space within chamber 200 will actually, at times, operate at subatmospheric pressures.

In the first described modification, a liquid level detector switch at 86 was illustrated and FIG. 14 shows a modified arrangement which has proved to be satisfactory in operation. In FIG. 14, an inverted stainless steel cup element 232 is provided in place of the detector 86 and is connected by a tube 234 with a diaphragm operated switch assembly 236. When the liquid level closes off the lower open end of inverted cup element 232, air is entrapped in the cup and when the liquid rises to a predetermined level, the pressure developed on the entrapped air will actuate the switch in assembly 236 and, in the same manner as liquid level detector 86, will operate the coil of a relay corresponding to relay R1 in the first described modification. The diaphragm operated switch, if large enough, could replace the relay.

As mentioned previously, it is understood that the term "cooking" as employed in the specification and the appended claims refers generally to the treatment of materials during which heat is supplied thereto in a closed chamber in the presence of steam or moist atmosphere and is not intended to refer solely to the conversion of food stuffs from a raw inedible condition to cooked edible condition. The term "cooking," is intended to comprehend all such treatments whether they are concerned with food stuff or other material.

Modifications can be made within the scope of the appended claims.

I claim:

1. A heating device comprising: a frame, a heat chamber in said frame having an metallic enclosure and an opening in one side thereof for receiving material to be heated and a closure door for sealingly closing said opening, latch means for latching said closure door closed, heat insulating material in said frame surrounding said metalic enclosure on all sides except the side having said opening, water supply means leading into said chamber for supplying water thereto and a fill valve therein, control means for controlling said fill valve to maintain the water in said chamber at a predetermined level, electrical heating means disposed in a relationship with said metallic enclosure for heating the water to generate steam in said chamber, relief valve means leading from said chamber to the atmosphere for maintaining a predetermined pressure on the steam in said chamber, a drain line leading from said chamber to drain liquid therefrom and a drain valve therein, and means to automatically open said drain valve when said heating means is deenergized, and said closure door being openable only when said heating means is deenergized.

2. A heating device according to claim 1 which includes a lock means operable for locking said latch means in latching position, and means for releasing said lock means to permit unlatching and opening of said closure door and operable only while said heating means is deenergized.

3. A heating device according to claim 2, which includes means for preventing energization of said heating means and opening of said fill valve except when said closure door is closed and latched.

4. A heating device according to claim 1, in which said control means comprising means for opening said fill valve to cause water to be supplied to said chamber and means responsive to said predetermined liquid level in said chamber for closing said fill valve.

5. A heating device according to claim 4, in which said frame includes a space therein at one side of said chamber and said drain and fill valves being mounted in said space.

6. A heating device according to claim 4, in which said metallic enclosure comprises top, bottom, back and sidewalls and open at the front, said sidewalls each comprising an outer wall and an inner wall spaced inwardly from the respective outer wall, each said inner wall at the bottom being formed to permit fluid flow between opposite sides thereof, said closure door closing the open front of said metallic enclosure when closed, and a wall member extending upwardly from the bottom wall of said metallic enclosure at the front of said metallic enclosure to a level higher than said predetermined liquid level.

7. A heating device according to claim 6, in which said supply conduit leads into said chamber between a said outer wall thereof and the adjacent inner wall, and said inner walls having support means on the sides thereof facing each other for supporting a heating vessel at a level above said predetermined liquid level.

8. A heating device according to claim 6, in which the chamber between said inner walls operates at negative pressure during at least a portion of the cycle.

9. A heating device according to claim 1, in which each said relief valve means comprises a tube leading from said chamber upwardly through the top wall of said device, a valve member of predetermined weight resting on the upper end of said tube, and retaining means retaining said valve member captive in the region of the upper end of said tube.

10. A heating device according to claim 9, in which said retaining means is in the form of inner and outer sleeve elements concentric with each other and with at least the upper end of said tube and mounted on the top wall of said device, said inner sleeve element having radial clearance from said valve member and extending to a level above said valve member, said outer sleeve having radial clearance from said inner sleeve and extending to a level above the upper end of said inner sleeve and having a perforated closure on the upper end, a porous disc of sound deadening material interposed between said perforated closure and the upper end of said inner sleeve, and a sleeve of sound deadening material interposed between said sleeve elements.

11. A heating device according to claim 1, in which said water supply means comprises a fill valve connected between a source of water and said chamber, a drain valve connected between said chamber and drain, a latch for latching said closure door in chamber closing position, a lock engageable with said latch to lock the latch in door-latching position, electric operators for said fill and drain valves and lock energizable for opening the respective valves and for releasing said lock, said heating means comprising electric resistance heating means, said timer being electrically operable, an energizing circuit and a main switch therein, a first switch having a blade connected to said main switch and having a first position in circuit with the said fill valve operator, said control means including a control circuit with the said fill valve operator, said control means including a control circuit including a second switch in said chamber responsive to the water reaching said predetermined level therein for causing the blade of said first switch to move to a second position, relay means energizable in response to movement of said blade into said second position and operable for initiating a supply of energy to said heating means and timer, means responsive to the elapse of the period for which said time is set for deenergizing said relay means for disconnecting the blade of said first switch from said main switch and for connecting the said operation for said lock and said drain valve to said main switch.

12. A heating device according to claim 11, which includes a normally open limit switch in series with said main switch and operated into closed position by actuation of said latch into door-latching position.

13. A heating device according to claim 11, which includes signal lights on said device connected for energization simultaneously with said heating means and drain valve operator, respectively.

14. A heating device according to claim 11, in which said control circuit comprises a stepdown transformer having its primary coil connected to said main switch, a rectifier connected to the secondary coil of said transformer, and a coil energizable for actuating the blade of said first switch from its first to its second position, and connected in circuit with said rectifier and said second switch, said second switch completing a circuit through said coil when the water level in said chamber means reaches said predetermined level.

15. A heating device according to claim 14, in which said relay means includes a holding circuit so that once energized it will remain energized until said timer times out, whereby the blade of said first switch can move to and from its said first position to maintain the water level in said chamber as may be determined by the operation of said second switch without influencing said relay means.

16. A heating device according to claim 15, which includes thermostatically controlled switch means in series with said heating means operable to control the supply of energy to said heating means and thereby control the rate of heat supply to the water in said chamber.

17. A heating device according to claim 1, in which said electrical heating means is in the form of electric resistance heating elements mounted on the underside of the bottom wall of said metallic enclosure.

18. A heating device according to claim 1 including an adjustable timer means operatively connected to said heating means for controlling the energization of said heating means to determine the length of a heating cycle.

PO-1050
(5/69)

UNITED STATES PATENT OFFICE
CERTIFICATE OF CORRECTION

Patent No. 3,604,895          Dated September 14, 1971

Inventor(s) ROBERT H. MAC KAY

It is certified that error appears in the above-identified patent and that said Letters Patent are hereby corrected as shown below:

Col. 1, line 38, "in" should be --- of ---.

Col. 3, line 32, "and" first occurrence, not shown in specification.

Col. 5, line 11, "77" does not appear in specification or amendments

Col. 8, lines 6 and 7 (Claim 11) "with the said fill valve operator, said control means including a control-circuit" should be deleted;

Col. 8, line 14 (Claim 11) "time" should be --- timer ---.

Col. 8, line 14, (Claim 11) "and" omitted between "means" and "for".

Signed and sealed this 11th day of April 1972.

(SEAL)
Attest:

EDWARD M. FLETCHER, JR.
Attesting Officer

ROBERT GOTTSCHALK
Commissioner of Patents